(12) United States Patent
Scopes

(10) Patent No.: US 7,770,104 B2
(45) Date of Patent: *Aug. 3, 2010

(54) TOUCH TONE VOICE INTERNET SERVICE

(76) Inventor: Philip M. Scopes, 613 W. Willow, Chicago, IL (US) 60614

( * ) Notice: Subject to any disclaimer, the term of this patent is extended or adjusted under 35 U.S.C. 154(b) by 1641 days.

This patent is subject to a terminal disclaimer.

(21) Appl. No.: 10/770,200

(22) Filed: Feb. 2, 2004

(65) Prior Publication Data

US 2004/0168120 A1 Aug. 26, 2004

(51) Int. Cl.
*G06F 17/00* (2006.01)
(52) U.S. Cl. .................. 715/234; 715/205; 715/764
(58) Field of Classification Search ............... 715/234, 715/201; 379/88.02–88.18; 709/217–219
See application file for complete search history.

(56) References Cited

U.S. PATENT DOCUMENTS

| | | | |
|---|---|---|---|
| 5,555,343 A | 9/1996 | Luther | |
| 5,884,262 A * | 3/1999 | Wise et al. | 704/270.1 |
| 5,953,392 A | 9/1999 | Rhie et al. | |
| 6,282,272 B1 | 8/2001 | Noonen et al. | |
| 6,349,132 B1 | 2/2002 | Wesemann et al. | |
| 6,366,650 B1 | 4/2002 | Rhie et al. | |
| 6,569,208 B2 | 5/2003 | Iyer et al. | |
| 6,606,611 B1 | 8/2003 | Khan | |
| 2002/0080927 A1* | 6/2002 | Uppaluru | 379/88.01 |
| 2007/0206737 A1* | 9/2007 | Hickman | 379/93.02 |
| 2008/0031429 A1* | 2/2008 | Rhie et al. | 379/88.17 |

\* cited by examiner

*Primary Examiner*—Doug Hutton
*Assistant Examiner*—Quoc A Tran
(74) *Attorney, Agent, or Firm*—McAndrews, Held & Malloy, Ltd.

(57) ABSTRACT

A method for touch tone voice internet service includes the steps of remotely retrieving a document including HTML tags, converting selected text in the document to speech, and enumerating links in the text document. The method further includes the steps of accepting touch tone input to designate one of the links as a selected link, and retrieving a second document specified by the selected link. As an example, the document may be a Hypertext Markup Language (HTML) document or an email message.

24 Claims, 6 Drawing Sheets

US 7,770,104 B2

TOUCH TONE VOICE INTERNET SERVICE

BACKGROUND OF THE INVENTION

The present invention relates to Internet web page browsing. In particular, the present invention relates to Internet web page browsing directed by touch tone input.

With the growth of the Internet have come very sophisticated Internet web page browsers. For example, both the Netscape Navigator™ browser and the Internet Explorer™ browser provide the user with the ability to move back and forth between hyperlinked web pages, view graphics, sound, and other multimedia files inline with, or separate from a web page, and interact with web sites (e.g., to provide order and billing information). Past Internet web page browsing technology, however, has relied heavily on the availability of a mouse or keyboard shortcuts to direct the browser.

Access to the Internet is available at virtually every phone jack in the world, for example, through TCP/IP, SLIP, and/or PPP dialup services. However, because past Internet web page browsing technology relied upon the mouse and keyboard inputs, effective Internet web page browsing has only been available, in the past, at those locations where a computer is available to direct the browser. In other words, in a substantial number of situations where an individual is not in front a computer, Internet web page browsing is impossible.

One previous attempt at providing remote access to Internet web pages is found in U.S. Pat. No. 5,953,392, entitled "Method and Apparatus for Telephonically Accessing and Navigating the Internet" to Rhie et al. The Rhie patent, however, starts the user at a default web page that in turn provides links to other web pages. Thus, Rhie does not provide a convenient mechanism that allows the user to move directly to a desired web page. In addition, a system is needed that interprets and presents the most up-to-date and complex HTML structures found in web pages, newsgroup threads, and embedded links in e-mail messages to the user in an intelligible manner.

A need exists in the industry for a touch tone voice internet service that addresses the problems noted above and others previously experienced.

BRIEF SUMMARY OF THE INVENTION

A preferred embodiment of the present invention provides a method for touch tone voice internet service. The method includes the steps of remotely retrieving a document including HTML tags, building a new text body based on the text in the retrieved document, converting the new text body to speech, and enumerating links in the retrieved document. The method further includes the steps of accepting touch tone input to designate one of the links as a selected link, and retrieving a second document specified by the selected link. As an example, the document may be a Hypertext Markup Language (HTML) document or an email message.

Preferably, the new text body includes HTML document hyperlink tag text prepended with link count text. In this fashion, the user may listen to an enumeration of links, and select one using touch tone input. The method processes many different types of HTML tags, including table, sound, hyperlink, graphic, paragraph, horizontal line, and other tags, as explained in more detail below.

Another preferred embodiment of the present invention provides a touch tone voice Internet browsing system. The browsing system includes a processing circuit, a communication interface, and a memory coupled to the processing circuit. The memory stores a computer program comprising instructions for remotely retrieving through the communication interface a text document including HTML tags, building a new text body based on the text document, converting the new text body to speech, and enumerating links in the text document. The computer program further includes instructions for accepting touch tone input to designate one of the links as a selected link, and retrieving a second document specified by the selected link.

The computer program further defines a touch tone character code comprising an at least two digit code per character. To this end, the character code may define any alphanumeric character, punctuation (e.g., ".", "/", "~", "-", " ", "@", and "_"), and "cancel" and "completion" codes. As noted above, the document may be a Hypertext Markup Language (HTML) document or an email message.

DETAILED DESCRIPTION OF THE INVENTION

Figure 1:
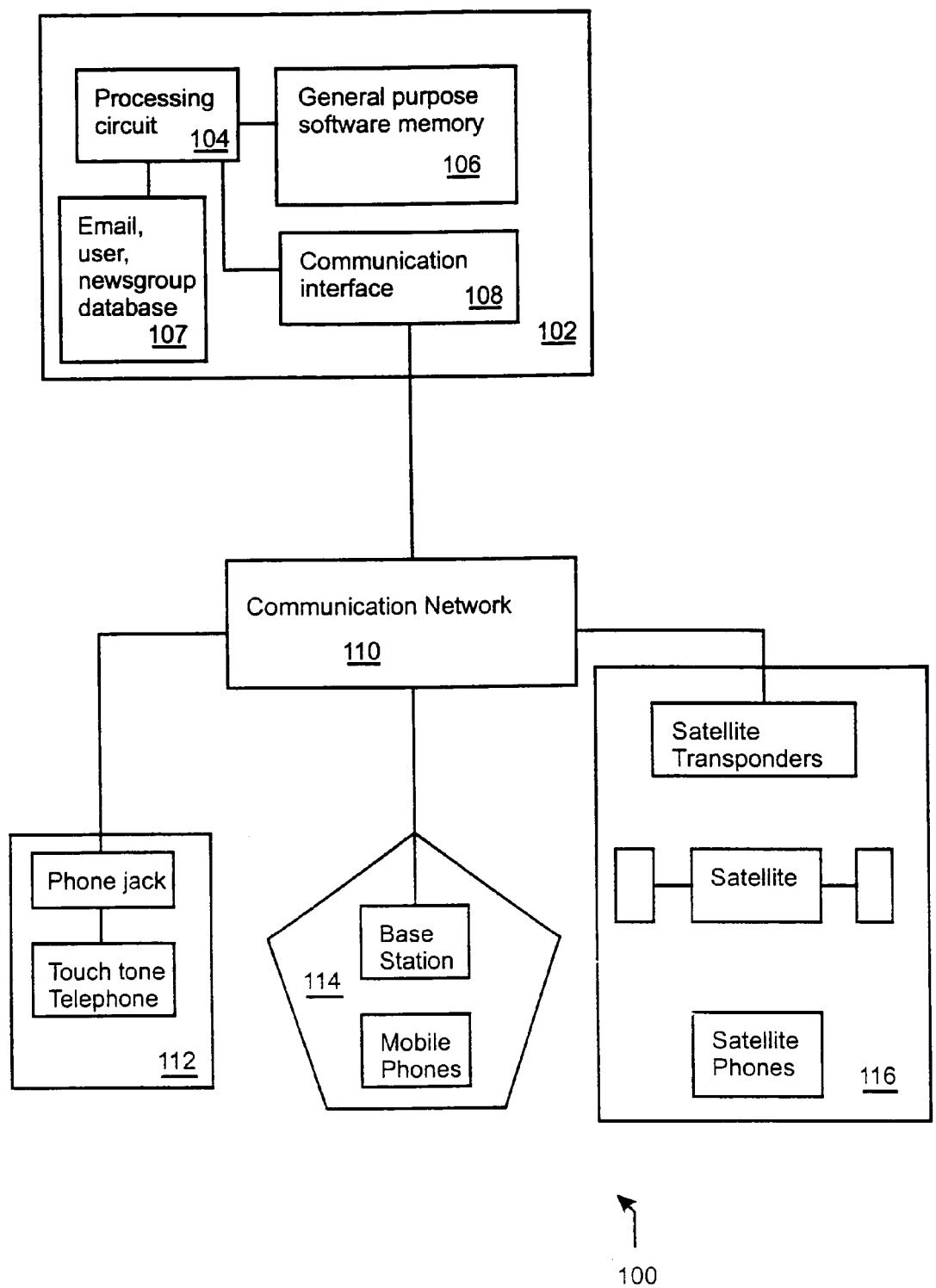
FIG. 1 illustrates a network configuration including a touch tone voice internet browsing system.

Turning now to FIG. 1, that figure illustrates a network configuration 100, including a touch tone voice Internet browsing system 102 ("browsing system 102"). The browsing system 102 includes a processing circuit 104 interconnected with a software memory 106, an email, user, and newsgroup database 107, and a communication interface 108. The software memory 106 is one example of a computer readable storage medium that stores instructions for execution by the processing circuit 104. The computer readable storage medium may be implemented, as examples, using a combination of one or more of a floppy disk, hard disk, magnetic tape, Read Only Memory (ROM), CDROM, or Random Access Memory (RAM).

FIG. 1 also illustrates a communication network 110 that connects the browsing system 102 to telephone network interfaces 112-116. The telephone network interface 112 represents a residential telephone connection (e.g., in a house), the telephone network interface 114 represents a cellular telephone connection, and the telephone network interface 116 represents a satellite telephone connection. Additional types of telephone network interfaces that provide Dual Tone Multifrequency (DTMF) support are also suitable.

The communication network 110 may represent, for example, Internet routing and switching functions, or may represent proprietary LAN or WAN networks. The communication interface 108 may be implemented, as examples, as network interface cards or modems, and may be hardwired or wireless. The processing circuit 104 may be a general purpose CPU, such as those in the Pentium™ line of processors. As will be explained in greater detail below, the software memory 106 stores instructions for execution by the processing circuit 104. The instructions allow the processing circuit 104 to provide touch tone Internet browsing to any remote user with a touch tone phone, through the network interfaces 112-116.

The browsing system 102 works with DTMF signals received over the communication network 110 at its communication interface 108. The communication interface 108 may include a multiport voice processing board (i.e., a telephony board) available from Dialogic in Parsippany N.J., 07054, for example. Such voice processing boards include their own Application Programming Interfaces (APIs) that support such functions as text to speech conversion, DTMF recognition, and the like. The software memory 106 stores a character code that maps DTMF signals to alphanumeric characters, punctuation, actions (e.g., "completion" and "cancel" actions), and the like. The software memory also stores the program code executed by the processing circuit 104. To that end, for example, the software memory may store code that includes functions provided by Artisoft's Visual Voice API, Visual Text-to-Speech API, Visual Voice Recognition API, functions provided by Microsoft's Visual Basic API, Dart Communication's Power TCP API, and Progress Software's Internet Toolpack.

As will be explained in more detail below, using the character code, the browsing system 102 accepts input from the user to direct the browsing system to web pages, email messages, newsgroup messages, and the like.

Figure 2:
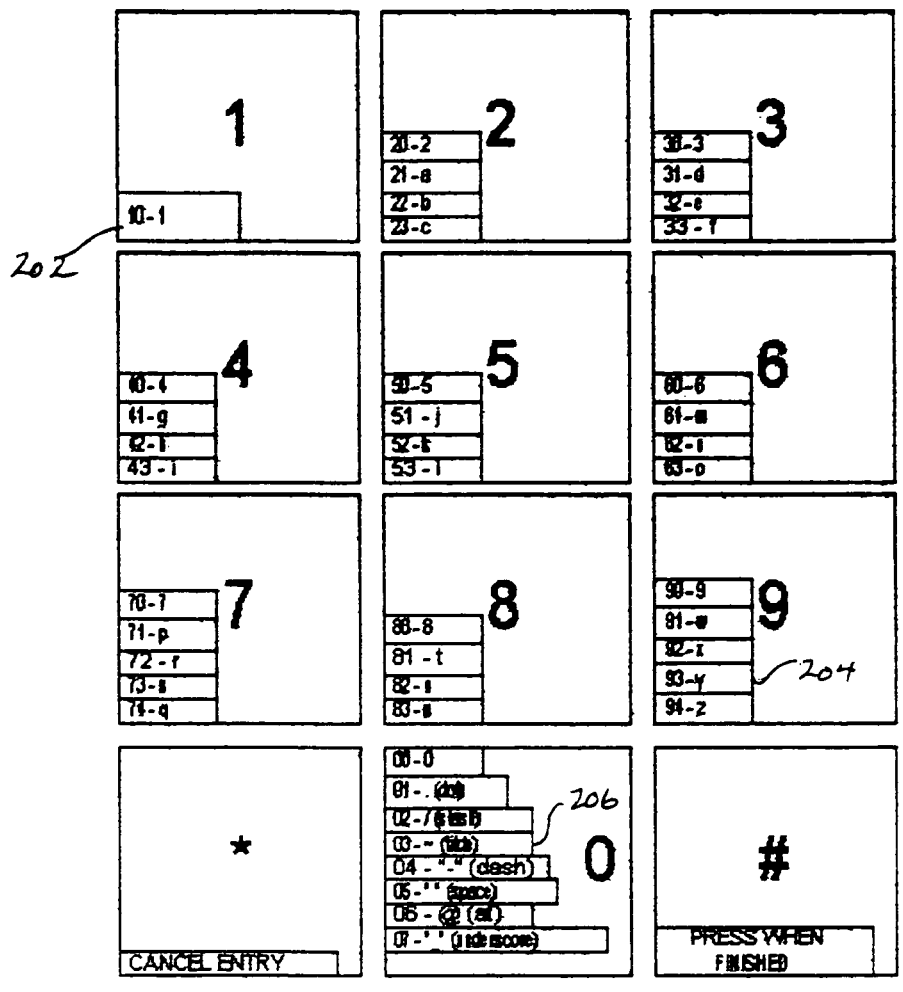
FIG. 2 shows touch tone character code.

Turning now to FIG. 2, that figure shows a touch tone character code 200, including exemplary character code sequences 202-206. The character code 200 is assigned to the touch tone keys 0-9, *, and #. The character code sequence 202 illustrates the two DTMF digit sequence 1 (one) and 0 (zero) that represents a 1 (one) character. Similarly, the character code sequence 204 illustrates the two DTMF digit sequence 9 (nine) and 3 (three) represents a y (the letter 'y') character. The two DTMF digit sequence 0 (zero) and 3 (three) represents the~(tilde) character (character code sequence 206). Additional code sequences (which are not necessarily restricted to two DTMF digits) may be provided for upper case characters. Note that the # (pound) and * (asterisk) keys are assigned to a "cancel entry" action and a "finished" action respectively.

FIG. 2 also illustrates an http address 208 and an email address 210 displayed above a corresponding DTMF character code sequence. In particular, the http address 208 is "www.net-by-phone.com" and the email address 210 is "phil@philmore.net". The character code representation of the http address 208 is 91 91 91 01 62 32 81 04 22 93 04 71 42 63 62 32 01 23 63 61 #. The character code representation of the email address 210 is 71 42 43 53 06 71 4243 53 61 63 72 32 01 62 32 81 #.

In other words, the browsing system 102 accepts the touch tone input noted above and converts it to an http address string or email address string. The * key cancels an entry, while the # key indicates completion of an entry. In this manner, the browsing system 102 may accept general input strings from the touch tone phone and responsively browse the Internet, read email, read newsgroups, and the like in conjunction with a text to speech engine discussed in more detail below.

Table 1 below presents one possible character code (also shown in FIG. 1) suitable for use with the browsing system 102.

TABLE 1

| Sequence | Character or Action |
|---|---|
| 10 | 1 |
| 20 | 2 |
| 21 | A |
| 22 | B |
| 23 | C |
| 30 | 3 |
| 31 | D |
| 32 | E |
| 33 | F |
| 40 | 4 |
| 41 | G |
| 42 | H |
| 43 | I |
| 50 | 5 |
| 51 | J |
| 52 | K |
| 53 | L |
| 60 | 6 |
| 61 | M |
| 62 | N |
| 63 | O |
| 70 | 7 |
| 71 | P |
| 72 | r |
| 73 | s |
| 74 | q |
| 80 | 8 |
| 81 | t |
| 82 | u |
| 83 | v |
| 90 | 9 |
| 91 | w |
| 92 | x |
| 93 | y |
| 94 | z |
| 00 | 0 |
| 01 | . |
| 02 | / |
| 03 | ~ |
| 04 | – |
| 05 | (SPACE) |
| 06 | @ |
| 07 | — |
| * | Cancel |
| # | Finished |

Figure 3:
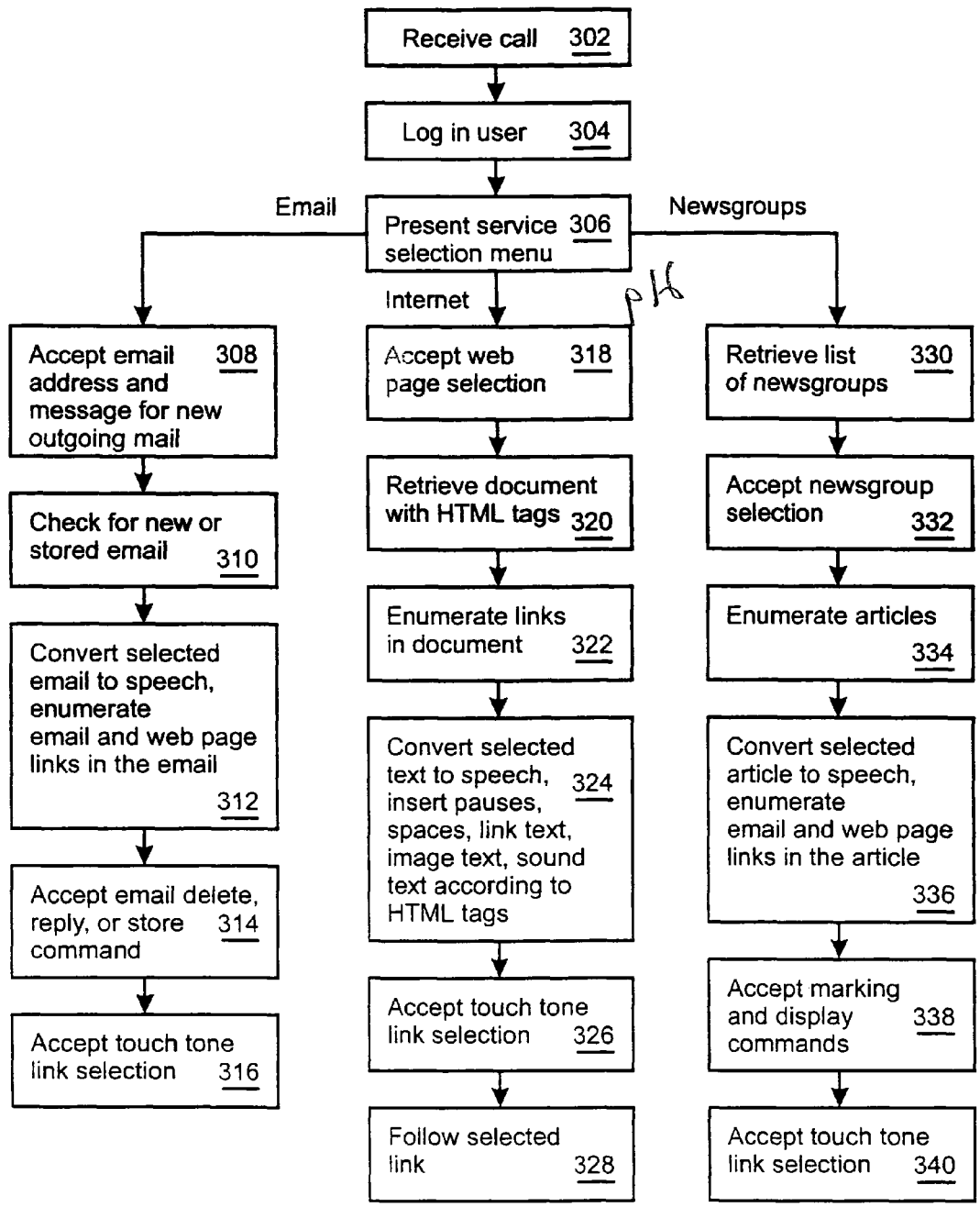
FIG. 3 shows a flow diagram of a method for touch tone voice internet browsing.

Turning next to FIG. 3, that figure illustrates a flow diagram 300 that shows the processing steps undertaken by the processing circuit 104. At step 302, the browsing system 102 receives an incoming call. In other words, a user at a touch tone phone has called the phone number assigned to the browsing system 102, and the telephony interface board answers the call. Next, at step 304, the browsing system 102 verifies (e.g., using a user name or account number and password) and logs in the user. To this end, the browsing system 102 accepts touch tone character codes as described above so that the user may enter his user name or account number and password with the touch tone phone.

After the browsing system 102 has verified the user name and password, it typically presents one or more menu selection options (step 308). As an example, the browsing system 102 may present the following options: Press 1 to check email, press 2 to send email or manage email address book, press 3 to browse the World Wide Web, press 4 to browse Usenet newsgroups, press 5 to change fax number, press 0 to reach customer service, and press * to disconnect.

Thus, for example, after selecting '1' to check email, the voice browsing system 102 preferably presents the following selection menu to the user: Press 1 to hear message body text with headers (e.g., from, date, subject, and the like), press 2 to delete a message, press 3 to reply, press 5 to jump to web pages or send email to addresses mentioned in the email text, press 6 to hear the message body without headers, press 7 to hear all of the message subject (optionally including the "from" address), five at a time, press '*' to exit, or press '#' to hear the next message. In conjunction with option 7, the voice messaging system further accepts numerical input to select one of the five email messages to listen to, or the '#' key to hear the next group of five messages.

Preferably, when working with an address book or the favorites menu, the browsing system implements Add, Delete, and Select functions (each presented as a menu option and assigned to a touch tone key). Thus, for example, after selecting Add, the browsing system 102 monitors the incoming DTMF tones for character codes representing a new email or web page address to add. Similarly, when a user has chosen to Delete or Select an entry, the browsing system 102 monitors the incoming DTMF tones for an entry number, and responsively deletes or selects the appropriate entry (i.e., a new email message is started or a selected web page is browsed).

As noted above, one option available to the user is to send new email messages. Thus, at step 308 the browsing system 102 allows the user to use the address book to select the recipient of the email, key in the address by touch-tone, or spell the recipient using his voice (and voice recognition software). Once the address is selected, the browsing system 102 prompts the user to record a voice message to be included with the email. Alternatively, the browsing system 102 may prompt the user to enter a message using the character code described above.

After recording the message, the browsing system 102 prompts the to send the message, play the message back for review, or re-record the message. When the user has recorded a voice message, the browsing system 102 may then convert the voice message to a .WAV (or other standard audio format) sound file, attach the .WAV file to the email message in MIME format, and send the email message to a mail server. A plaintext body may also be attached to the email message that includes text describing, promoting, or advertising certain products or services. The email messages are then sent, for example, using the SMTP protocol.

The browsing system 102 also allows the user to receive email either in a mailbox provided by the browsing system 102 itself, or provided on a mailserver located elsewhere on the Internet. Thus, at step 310, the browsing system 102 queries the mailserver specified in the user record in the database 107 to see if there is any email. The browsing system 102 then announces to the user the number of pending email messages. Preferably, the voice browsing system 102 proceeds to announce the subject line and sender name and address. The user may then choose from a menu of options whether to hear the body of the message, with or without headers (date sent, time sent, and the like), delete the message (e.g., using the '2' key), reply to the message, or move on to the next message.

In replying to a message, the voice browsing system 102 preferably presents the user with the option to send one of several preselected plain text replies (e.g., "Yes," "No," "I'll get back to you as soon as possible" or "Call me back at the following number: #"). The phone number may be entered using voice recognition or the character code described above.

As noted above, the browsing system 102 presents the user with the option to hear the body of the email message. To this end, at step 312, the browsing system 102 converts the email message text to speech using, for example, the SayFile( ) function provided by Visual Text-to-Speech, and the speech is played back to the user over the phone line. During playback, the browsing system 102 recognizes preassigned DTMF tones assigned to canceling, speeding up or slowing down playback, increasing or decreasing volume, pausing playback, "fast-forwarding" or "rewinding" the playback. For the purposes of the fast-forward or rewind, the browsing system 102 may continue playback 10 seconds later or earlier in the audio file respectively every time the appropriate touch tone key is pressed.

As one example, the voice browsing system 102 may recognize the '1' key to restart playback of the current email message, the '2' key to slow down playback, the '3' key to speed up playback, the '4' to reduce volume, the '5' key to set default volume, the '6' key to raise volume, the '7' key to rewind, the '8' key to fast-forward, and the '*' key to stop playback.

During step 312, the browsing system 102 also enumerates email and web page links in the email message. This may be accomplished by searching the email text and building a list of words delimited by commas, spaces, or the like. Web pages are thereby identified by locating the "http://" or "www." strings, while email addresses are identified by locating words that contain an @ ("at") sign. After accepting any email delete, reply, or store commands (step 314), the browsing system 102 will accept, at step 316, a touch tone link selection for the purposes of sending email to or retrieving the web page corresponding to one of the addresses.

As an example, the browsing system 102 may announces that "This email message contains email addresses or web addresses. Press 1 to send email to phil@hilmore.com— Press 2 to browse www.net-by-phone.com. Press the Star Key to cancel. Make your selection now." If the user presses the touch tone key corresponding to an email address, the system continues as described above with reference to sending an email message. On the other hand, if the user presses the touch tone key corresponding to a web address, the browsing system 102 will begin the procedure described below to present Internet web pages to the user.

Still with reference to FIG. 3, the browsing system 102, at step 318, accepts a web page selection from the user. One option presented by the browsing system 102 is to allow the user to select a web page whose address is stored in the user's favorites menu, again by assigning a number to each web page address, and monitoring for DTMF tones that indicate a selection. Additionally, the browsing system 102, presents the user with the option to add a web address to the favorites menu, delete a web address from the favorites menu, or enter a web address to browse using the character code described above. When the user adds a web address or selects a web address to browse, the user may either spell the web address with his voice, or key in the web address using the character code (e.g., as a series of DTMF key inputs).

Once the browsing system 102 has the web address to browse, the browsing system 102 retrieves the corresponding document (step 320). As one example, the browsing system 102 may retrieve the document using an HTTP retrieval function provided by the Power TCP software library or the Internet Toolpack software library. Preferably, if the web page is not found, or another error occurs during retrieval, the browsing system 102 will announce the error to the user. In most instances, the document will be an HTML text file, though virtually any text file with HTML tags may be processed by the browsing system 102. In both cases links of certain types (discussed below) are located and enumerated (step 322).

When the browsing system 102 successfully retrieves the document, the document is stored in a buffer. A sound file document (e.g., a .WAV file) may then be played immediately out of the buffer, while text document will first be processed by the browsing system 102 text-to-speech engine, then played to the caller. If the document is in HTML format (e.g., the document includes HTML tags such as a <TITLE> tag), then the browsing system 102 will translate selected text in the document (step 324) as outlined below. The selected text comes directly from the document and from additional text cues provided automatically be the browsing system 102, which subsequently plays the selected text to the user over the phone line using the text-to-speech engine. As noted above with regard to email messages, the browsing system 102 monitors for touch tone keys for changing the speed, volume, and playback position of the document.

HTML Translation preferably proceeds with regard to individual tags, forms, and frames as described below:

Forms—The browsing system 102 identifies any forms present in the document. A form extraction tool, such as the Crescent Internet FORM tool written by Progress Software may be used to perform this function. Each form in the document is stored in a form object data structure that enumerates the form type, fields, and the like.

Special characters—The browsing system 102 searches for special characters in the document. The special characters may include, for example, forced space characters (coded as " " in HTML), ampersands ("&"), and accented vowels such as the "e" ("è"). For each of the special characters found, the browsing system 102 substitutes text that allows the text-to-speech engine to read the special character appropriately. For example, the code "&" will be replaced by "&" and the code " " will be replaced by a single space (" ").

HTML Tags—The browsing system 102 starts with the first character in the HTML file and writes all text up to the first HTML tag into an area of memory set aside for a new HTML body. When the browsing system 102 encounters an HTML tag, the browsing system 102 determines the type of tag and processes the tag as indicated below:

<TITLE>—The browsing system 102 switches speech output from a first voice (e.g. a male voice such as the "Paul" voice provided by the DecTalk TEXT-TO-SPEECH ENGINE) to a second voice (e.g., a female voice such as the "Betty" voice provided by DecTalk TEXT-TO-SPEECH ENGINE). The browsing system 102 also stores the title text (which includes any text between the <TITLE> and </TITLE> HTML tags) in a string variable to allow the user to store the title in as a selection on the favorites menu.

<FORM>—The browsing system 102 increments a form counter that identifies the form by number and further maintains a form item counter. The form item counter tracks the number of form elements within the current form (such as text boxes, check boxes, and the like). The form counter value corresponds to the number of the form stored in the form object data structure referenced above.

<SELECT>—The browsing system 102 increments the form item counter as well as a link counter. The link counter, as will be seen below, is also used to identify hyperlinks, frames, and form elements with which the user may interact. Thus, when the user selects a form element link, the browsing system will allow the user to enter a value for that element. For example, in the case of a selection pull-down menu, the browsing system 102 extracts all the options available (present in the original document), store them for later readback, and present the user the opportunity to select an option when the selection menu is selected as a link. The browsing system 102 also prepends link text for this tag to the output to be converted to speech. The link text may be, for example, "Link [number]: Select Option", and may be read in an alternate voice to call attention to the Select option.

<INPUT> and <TEXTAREA>—The browsing system 102 increments the form item counter and the link counter, and adds link text (e.g., "Link [number:] Fill in Text Box" or "Link [number]:Select Radio Button.") to the selected text to be presented to the user. As noted above, the user has the option of selecting any of these links by number (assigned to a DTMF character code) to provide a value for the form element (again provided using the character code). If form item a "Submit" button, the browsing system 102 uses the HTTP Retrieval tool to submit the form responses for that form to the page specified in the <FORM> tag, the page is retrieved, and the web retrieval procedure is repeated on the newly retrieved page.

<SCRIPT>—All material up to and including the <SCRIPT> tag, or to the end of the page if there is no </SCRIPT> tag, is preferably ignored.

<TABLE>—The browsing system 102 initializes a two-dimensional array of strings that will be used to represent cells in a table:

<TR>—The browsing system 102 increments a table row counter and the text that follows will is written to the cell identified by the values in the table row counter and a table column counter.

<TD> and <TH>—Because these tags denote individual table cells, the browsing system 102 increments the table column counter so that the text that follows will be written into a new column.

</TABLE>—This tag denotes the end of the table. The browsing system 102 writes all cells that were collected in the procedure described above to the main new HTML body in one of three ways: horizontally, vertically, or horizontally with the header (i.e., the cell in the first row) repeated for each element. This allows for tables to be read more clearly in different contexts. The browsing system 102 provides a menu option to the user for selecting the table reading method (e.g., horizontal, vertical, or horizontal with header).

Note that tables may include subtables. In order to process such structures, the voice browsing system 102 maintains a table level that is incremented each <TABLE> tag and decremented each </TABLE> tag. When HTML is read from a web page and inserted into the new HTML body, the voice browsing system 102 copies the HTML into an array with table level, row, and column subscripts. Thus, when the </TABLE> tag is encountered, the voice browsing system 102 decrements the table level and continues to build the next outer table.

<SUB>, </SUB>, <SUP>, and </SUP>—These tags mark the beginning and ending of text to be printed as subscript and superscript. The browsing system 102 preferably substitutes a space to separate the subscripted or superscripted text from the rest of the text.

<OL> and <UL>—These tags set forth ordered and unordered lists respectively. The browsing system 102 sets a flag indicating the "list type" (ordered or unordered) so that the list that follows will be processed accordingly:

<LI>—The browsing system 102 inserts a comma-length pause in the speech output. For an ordered list, the browsing system 102 inserts the additional text "Item[n]" where n is an item number tracked by the browsing system 102. The browsing system 102 thereby allows numbered "bullet points" to be spoken in sequence with their numbers preceding them.

</UL>—This tag indicates the end of the list. The browsing system 102 responsively resets the list counter to zero.

<A>—This tag denotes the start of a hyperlink. The browsing system 102 increments the link counter and stores the URL (specified in the HREF attribute associated with the tag) in memory. The URL is identified by the number currently stored in the link counter. The browsing system 102 preferably reads the text following the <A> tag in an alternate voice and inserts the link text "Link [n]" where n is the current value of the link counter. The browsing system 102 thereby identifies each link for the user and allows the user to jump to the hyperlink by selecting a link number using the character codes.

</A>—This tag denotes the end of a hyperlink. In response, the browsing system 102 preferably inserts a comma-length pause in the speech output and changes the voice back to a standard voice (e.g., a male voice).

<P>, <HR>, </TD>, </TR>, </TH>—For paragraph separations, horizontal lines, or tags that indicate ends of table elements, the browsing system 102 inserts a comma-length pause for the purpose of separating text at these points.

<IMG>—For an image tag, the browsing system 102 inserts a comma-length pause, and any text specified in the associated ALT attribute which usually provides descriptive image information for the benefit of the user.

<BGSOUND>—This tag indicates a sound file to be played at the same time the page is viewed browser. Because the browsing system 102 does not rely on visual communication of data, the browsing system 102 instead creates a hyperlink (and increments the link counter) to the sound file as though the <BGSOUND> tag were an <A> tag. The browsing system 102 additionally inserts the sound text "Background Sound File" into the new HTML body speech output so that the user will know that there is a sound file available to be played.

<FRAMESET>—Upon encountering this tag, the browsing system 102 adds frame text to the selected text to be converted to speech. The frame text is preferably a message indicating that the document includes multiple frames, and that user may select any frame by selecting a frame number as a link.

<FRAME>—This tag indicates that a frame is present. The browsing system 102 processes each frame as a separate hyperlink because each frame points to a separate HTML document. The frames are enumerated and added as links in the same fashion as the browsing system 102 processed the <A> tag. Frame text is pretended to the speech output, for example, "Frame n" will be inserted into the speech output instead of "Link n." The browsing system 102 also preferably adds the text in the <NAME> attribute of the FRAME tag to the speech output to provide a label for the link.

<AREA>—This tag indicates an image map (i.e., hyperlinks activated by clicking on a section of an image with the mouse when using a visual web browser). When encountering the <AREA> tag, the browsing system 102 proceeds by treating the tag as a hyperlink in the same fashion as the <A> tag was processed. In addition, the browsing system 102 preferably adds the text in the associated ALT tag to the new HTML body speech output.

<CITE>, <BIG>, <MARQUEE>, <HEADLINE>, <EM>, <STRONG>, <SMALL>, <BLOCKQUOTE>, <ADDRESS>, <CENTER>, <H1>, <H2>, <H3>, <H4>, <H5>, <H6>, <B>, <I>, and<U>—These tags indicate emphasized text or special fonts, and the voice browsing system 102 preferably treats them as a signal to change the output voice (e.g., from a male voice to a female voice) for the purpose of emphasizing the text that follows.

</CITE>, </BIG>, </MARQUEE>, </HEADLINE>, </EM>, </STRONG>, </SMALL>, </BLOCKQUOTE>, </ADDRESS>, </CENTER>, </HI>, <H1>, <H3>, </H4>, </H5>, </H6>, </B>, </I>, and</U>—These tags indicate the end of text to be emphasized, and the voice browsing system 102 will accordingly change the speech output back to a standard voice (e.g., the male voice in the DecTalk speech engine).

Plain text may follow any of the tags. Preferably, the browsing system 102 adds all plain text (until the next HTML tag is encountered) to the new HTML body speech output. The processing described above continues until the end of the HTML page is encountered.

Once the browsing system 102 has processed the document, the browsing system 102 asks the user to select a link number followed by the # key. The browsing system 102 accepts the user input (step 326) and follows the selected link (step 328) as explained in more detail below.

For a selected hyperlink to a new web page, the browsing system 102 retrieves the new web page, processes it as noted above, and plays back the new web page as speech to the user.

When the link represents a form element, the browsing system 102 processes the form elements in slightly different manners. For example, when the link represents a check box, the browsing system 102 stores a value in the form collection which is the opposite state of the checkbox. For example, if the box is unchecked the browsing system 102 will mark it as checked. When the link represents a menu of selections or radio buttons, the browsing system 102 offers the user a list of options (extracted from the original document) and allows the user to choose one by number. When the link represents a text box, the browsing system 102 accepts user input to spell a response by character code or by voice. If the link is a Submit button, the browsing system sends the responses in the form elements for the corresponding form to the web server and retrieves the page specified in the associated "FORM" tag.

When the link represents a sound file, such as a .WAV file, the browsing system retrieves the .WAV file and plays it for the user. If the browsing system 102 encounters any type of data that it cannot process, the browsing system 102 informs the user, but continues to allow the user to make menu selections, follow links, and the like.

After the browsing system 102 has played the web page for the user, the browsing system 102 allows the user to add the web page to the user's favorites menu by selecting a menu option for this purpose. Additional menu options include Go Back a Page (which commands the browsing system 102 to reload and begin playback of the previously retrieved web page). To this end, the browsing system 102 may track the user's browsing activity with an array of strings containing the URL of each page browsed in the order browsed. Yet another menu option is the Change Table Reading Method option. This option directs the browsing system 102 to change way in which cells are processed (e.g., horizontally, vertically, or horizontally with the header (i.e., the cell in the first row) repeated for each element) as described above with regard to table elements. Additional options include Reload Page which directs the browsing system 102 to retrieve and reprocess the current web page again, and Replay Page which directs the browsing system 102 to replay the current page without reloading its content.

As noted above, the browsing system 102 may also be used to allow a user to review news group messages using DTMF tones. With continued reference to FIG. 3, the voice browsing system, at step 330, first retrieves a list of available newsgroups, and may periodically check the news server for new newsgroups. Next, at step 322, the browsing system 102 accepts a newsgroup selection from the user. In particular, newsgroup selection may proceed in the same ways as web page selection (i.e., by selection from a favorites menu, keying in a newsgroup, or selecting the newsgroup as a link from another document). To that end, the browsing system 102 maintains a news group favorites menu, and allows the user to add, delete, or select newsgroups.

Continuing at step 334, the browsing system 102 enumerates the articles present in the selected newsgroup. In other words, each article to be presented to the user is assigned a unique number, and may also have an article subject line and link text (such as "Link [n]") prepended. Article threads may also be collected under a single link, for example, and selection of that link may then cause the browsing system 102 to enumerate each article in the thread for possible user selection.

Furthermore, the browsing system 102, for each article selected by the user, converts the article text to speech for presentation to the user. In addition, the browsing system enumerates email links and web page links in the newsgroup article (as explained above with regard to email messages). The browsing system presents these links to the user after the current newsgroup article has been read to the user. To this end, a menu that allows the user to follow links, archive the newsgroup article, transmit the newsgroup article by facsimile, and the like may be presented by the browsing system 102.

The browsing system 102 may also (step 338) accept input from the user from a menu with presentation options (e.g., present all articles, new articles, or unread articles). At step 340, the browsing system 102 accepts touch tone input to select any of the links that the browsing system 102 has enumerated.

Figure 4:
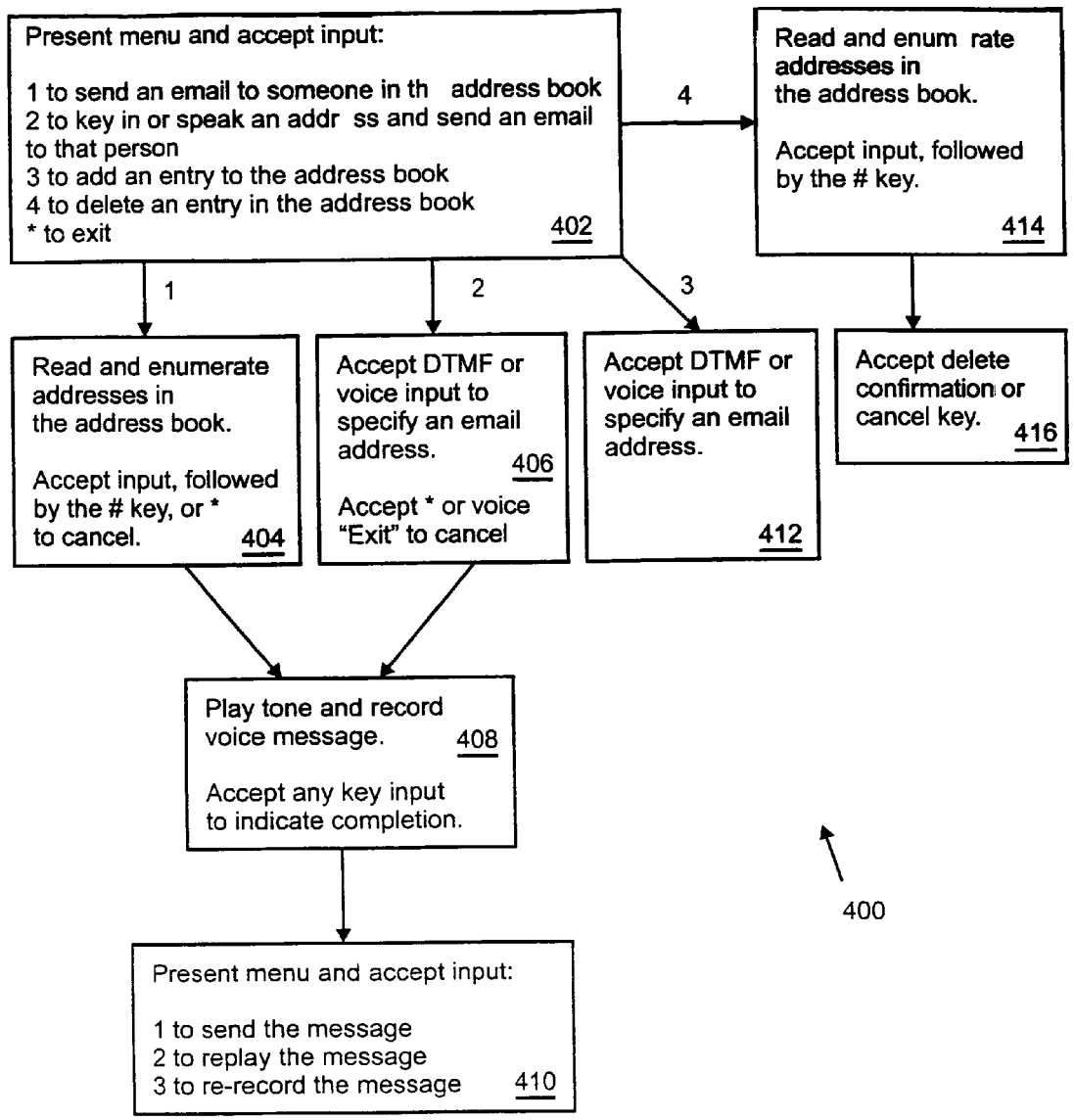
FIG. 4 presents a flow diagram of the processing that occurs when sending email or managing an email address book.

Turning now to FIG. 4, that figure presents a more detailed flow diagram 400 of the processing preferably provided when sending email or managing an email address book. In particular, the voice browsing system 102, at step 402, presents the user with the following options: Press 1 to send an email message to an individual in the address book, press 2 to enter an address and send email to that address, press 3 to add an entry to the address book, press 4 to delete an entry from the address book, and press '*' to exit.

Thus, at step 404, the voice browsing system 102, reads the addresses currently in the address book, and accepts numerical input as a selection, followed by the '#' key. In addition, the user may press the '*' to cancel. Alternatively, at step 406, the user may key in or speak an email address. Continuing at step 408, the voice browsing system records (e.g., as a .WAV file) the message to be sent, and accepts any key to indicate completion of the message. Then, at step 410, the voice messaging system 102 presents the user with the following options: Press 1 to send the message (e.g., with the .WAV file attached), press 2 to replay the message, and press '3' to re-record the message.

As previously mentioned, the user may select to add an entry to the address book. Thus, at step 412 the voice browsing system 102 allows the user to key in, or speak, the new email address, and adds the new email address to the address book. In a similar fashion, when deleting an address book entry, the voice browsing system 102, at step 414 reads the addresses in the current address book and accepts a numerical selection for an address to delete. Continuing at step 416, the voice browsing system requests confirmation of the delete action (e.g., pressing the '#' key again), and deletes the selected entry.

Figure 5:
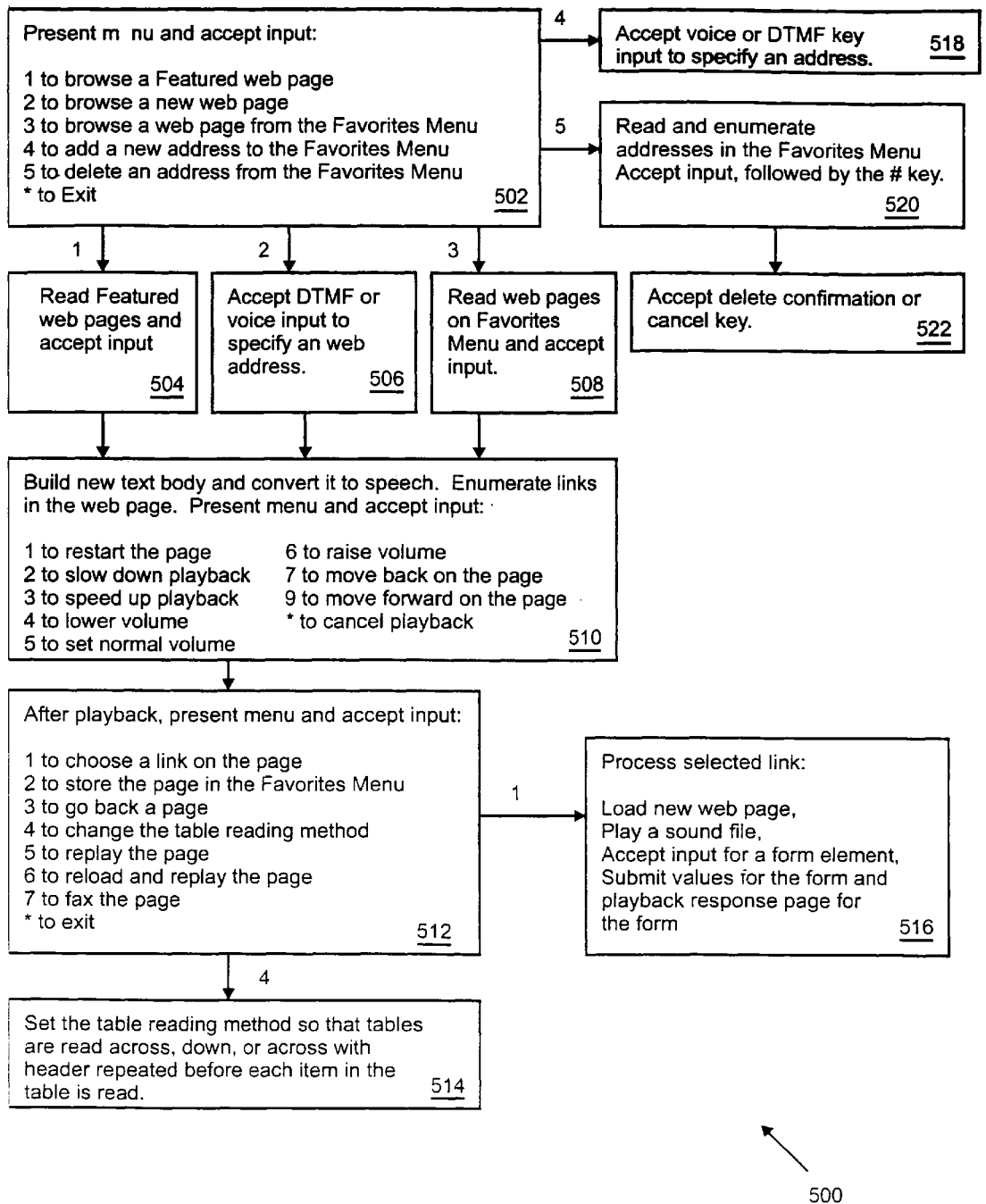
FIG. 5 shows a flow diagram of the processing that occurs when browsing the world wide web.

Turning next to FIG. 5, that figure illustrates a flow diagram 500 of the processing that occurs when browsing the Internet. Starting at step 502, the voice browsing system 102 presents the user with the following menu options: Press 1 to browse a Featured Web Page, press 2 to browse a new web address, press 3 to browse a web page from the Favorites Menu, press 4 to add a new address to the Favorites Menu, press 5 to delete an address from the Favorites Menu, and press '*' to exit. The Featured Web Pages are a separately maintained list of web pages provided by the voice browsing system 102 that may be of particular interest to a user.

At step 504, the voice browsing system reads the list of Featured Web Pages and accepts a numerical selection. Alternatively, the voice browsing system accepts a keyed in or spoken address to browse at step 504. A further alternative, at step 508 is to select a web page from the favorites menu. To that end, the voice browsing system reads the web pages in the favorites menu, and selects numerical input, followed by the '#' to indicate a selection.

Subsequently, at step 510, the voice browsing system reads text from the selected web page, according to the processing steps described above. In addition, while the web page is being read back to the user, the voice browsing system 102 recognizes, preferably, the '1' key to restart playback of the page, the '2' key to slow down playback, the '3' key to speed up playback, the '4' to reduce volume, the '5' key to set default volume, the '6' key to raise volume, the '7 ' key to move back on the page, the '8' key to move forward, and the '*' key to stop playback.

Proceeding to step 512, once the text has been played back to the user, the voice browsing system 102 presents a menu of options to the user, including: Press 1 to select a link on in the web page just read, press 2 to store the web page address in the favorites menu, press 3 to go back to the previous page (e.g., in the same fashion as pressing the "Back" button on a web browser), press 4 to change the table reading method (discussed above), press 5 to replay the text, press 6 to reload, reprocess, and play the reprocessed web page text, press 7 to fax the web page (discussed below), and press '*' to exit.

Thus, for example, the voice browsing system proceeds to step 514 in order to allow the user to select one of the table reading options available. As another example, if the user selects a link on the page, the voice browsing system 102 proceeds to step 516, where, as discussed in more detail above, the voice browsing system loads a new web page, accepts form input, plays back a sound file, submits form data, and the like.

As noted above, one of the primary options available is to add an new address to the favorites menu. To that end, the voice browsing system executes step 518, at which the user keys in or speaks the new address. Once the new address is entered, the voice browsing system 102 adds the new address to the favorites menu. In a complementary fashion, the voice browsing system 102, at step 520 presents the user with a list of addresses in the favorites menu, and accepts numeric input to indicate an address to be deleted. Upon confirmation of the deletion (step 522), for example, pressing the '#' key a second time, the voice browsing system 102 removes the address from the favorites menu.

Figure 6:
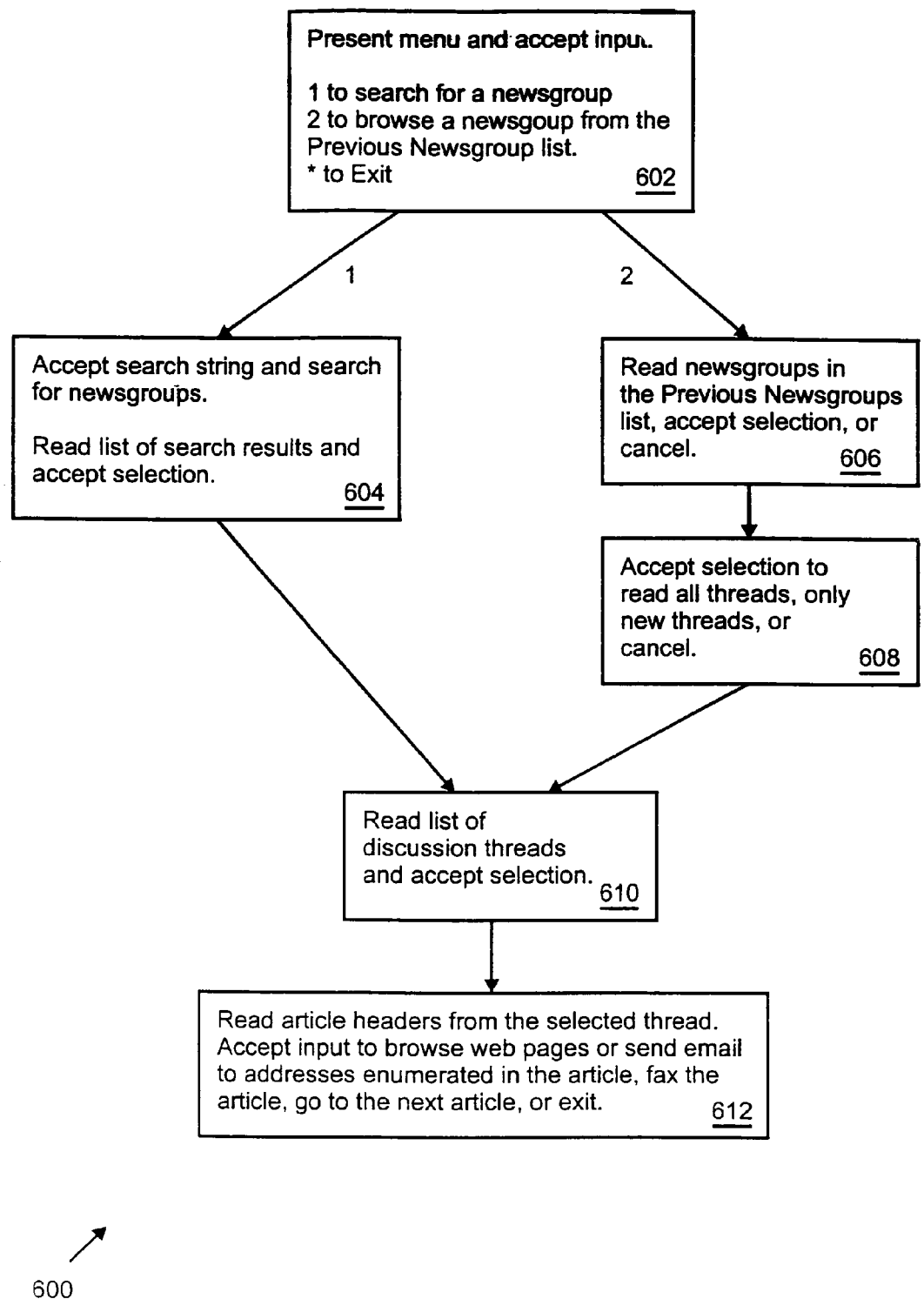
FIG. 6 presents a flow diagram of the processing that occurs when browsing Usenet newsgroups.

Turning now to FIG. 6 that figure presents a high level flow diagram 600 of the processing that occurs when the user chooses to browse Usenet newsgroups. Thus, at step 602, the voice browsing system presents a menu with the options to: Press 1 to search for a newsgroup, press 2 to browse a newsgroup from a Previous Newsgroup list, or press '*' to exit.

If the user chooses to search for a newsgroup, the voice browsing system, at step 604, accepts a search string from the user, searches for newsgroups containing the string, and reads the newsgroups returned from the search to the user. On the other hand, at step 606, the voice browsing system 102 reads those newsgroups stored in the previous newsgroups list, and accepts a selection from the user. Continuing at step 608, the voice browsing system further accepts input to select whether to read all the threads in a newsgroup, read only new articles, or cancel.

Proceeding to step 610, the voice browsing system 102 reads a list of the discussion threads and accepts a selection for which thread to read. This may be accomplished by enumerating each thread, and accepting numeric input from the user. At step 612, the voice browsing system 102 reads article headers from the selected thread. In a fashion similar to that described above with regard to email and web pages, the voice browsing system enumerates links in the newsgroup messages, and accepts user input (e.g., '1') to browse web pages, or send email to addresses in the newsgroup article. The voice browsing system 102 also accepts an input selection (e.g., '2' ) that allows the user to fax the newsgroup message to any phone number subsequently input. In addition, the user may enter, for example, '#' to move to the next article in the thread, or '*' to exit.

As noted above, an additional capability provided by the voice browsing system 102 is document facsimile transmission on demand. To the end, the browsing system 102 adds a menu choice that allows the user to select a Send Fax option. The browsing system 102 then sends the currently processed document, whether it be a web page, email message, or a newsgroup article, to the facsimile number entered by the user. The browsing system 102 may accomplish this by sending by electronic mail the currently processed document with destination facsimile number to faxaway.com, or any other Internet facsimile service.

As noted above, the voice browsing system 102 accepts voice input in many different situations (e.g., to enter a web page address, or email address). In order to more accurately covert voice input to text, the voice browsing system 102 preferably proceeds as follows. First, the voice browsing systems 102 beeps after each character successfully recognized. The following acronyms, however, may be used after a beep: '.com' ("dot com"), '.net' ("dot net"), '.org' ("dot org"), and 'www' ("double-you double-you double-you"). Second, while most letters are recognized just by saying the letter, some letters are preferably said with indicator words after them:
A as in "apple"
B as in "boy"
F as in "Frank"
H as in "Harry"
K as in "Kenny"
M as in "Mary"
N as in "Nancy"
P as in "Peter"
S as in "Sam"
T as in "Tom"
Z as in "Zebra"

Third, digits are entered by saying the word "Number" first (e.g., "Number one").

Fourth, the voice browsing system 102 recognizes the following phrases for special characters:
"At sign" for '@'
"Dot" for '.'
"Dash" for '-'
"Slash" for '/'
"Space" for ' '
"Tilde" ("Till-dah") for '~'
"Underscore" for '_'

The voice browsing system 102 recognizes continued silence or the word "Enter" to indicate completion of a voice entry, and "Exit" to exit text entry mode (as opposed to pressing the '*' key), and the word "continue" may be spoken instead of the '#' key to go to the next email or Usenet message. Furthermore, the voice browsing system 102 accepts voice input answers to all system prompts by recognizing numbers in voice form.

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Thus, for example, the above described browsing system may provide an interface to internet chat systems such as AOL Instant Messenger or Yahoo Page that will allow a user to monitor a "buddy list" to see who is logged into the system, hear text of messages sent by chat-system users, and deliver voice or text responses to chat-system users. Therefore, it is intended that the invention not be limited to the particular embodiment disclosed, but that the invention will include all embodiments falling within the scope of the appended claims.

The invention claimed is:

1. A method for telephone-based electronic communication, said method comprising:
receiving an incoming telephone call from a user;
allowing said user to enter login and password information using predetermined codes;
verifying login and password information for said user to provide access to a menu of communication options;
presenting a menu of communication options to said user including:
  interacting with an e-mail account; and
  browsing the internet; and
allowing said user to select one of said communication options using a predetermined code,
wherein said communication option of browsing the internet includes:
  accepting a document location from said user specified by at least one of a favorites menu and a user input;
  retrieving a text document including HTML tags specified by the document location;
  building a new text body based on the text document, wherein the new text body includes HTML document table text in accordance with a subscript tag and a superscript tag; and
  further comprising adding comma length pauses in accordance with at least one of: a list item tag, a hyperlink tag, a paragraph tag, a horizontal line tag, and a table element end tag in the HTML document;
  converting the new text body to speech;
  listing at least one link in the text document;
  accepting input from said user to designate one of said links as a selected link; and
  retrieving a second document specified by the selected link,
wherein said communication option of interacting with an e-mail account includes:
  retrieving an e-mail from a mail account;
  listing the subject line and send name of said e-mail for said user;
  presenting the user with the option of sending one of several preselected replies by entering a code; and
  sending an e-mail reply selected by said user.

2. A method according to claim 1, wherein the text document is a Hypertext Markup Language (HTML) document.

3. A method according to claim 2, wherein the new text body includes HTML document hyperlink tag text prepended with link count text.

4. A method according to claim 3, wherein the new text body includes title HTML document text.

5. A method according to claim 2, wherein the new text body includes HTML document text proceeding a first HTML tag in the HTML document.

6. A method according to claim 2, wherein the new text body includes HTML document image tag text specified by an ALT attribute.

7. A method according to claim 2, further comprising adding background sound indication text to the new text body in accordance with a background sound tag in the HTML document and wherein the step of enumerating links includes enumerating a background sound link according to the background sound tag.

8. A method according to claim 2, further comprising enumerating frames in the HTML document and adding frame count text to the new text body.

9. A method according to claim 2, further comprising the step of switching the speech between a first voice and a second voice to emphasize predetermined tagged text in the HTML document.

10. A method according to claim 9, wherein switching comprises switching to the second voice to emphasize at least one of header, bold, italic, underlined, citation, big, marquee, headline, em, strong, small, blockquote, address, and center tagged text, and switching back to the first voice after the predetermined tagged text.

11. A method for telephone-based electronic communication, said method comprising:
receiving an incoming telephone call from a user;
allowing said user to enter login and password information using predetermined codes;
verifying login and password information for said user to provide access to a menu of communication options;
presenting a menu of communication options to said user including:
interacting with an e-mail account; and
interacting with the internet; and
allowing said user to select one of said communication options using a predetermined code,
wherein said communication option of interacting with the internet includes:
accepting a document location from said user specified by at least one of a favorites menu and user input;
retrieving a document specified by said document location;
building a new text body based on the text document, wherein the new text body includes HTML document table text in accordance with a subscript tag and a superscript tag; and
further comprising adding comma length pauses in accordance with at least one of: a list item tag, a hyperlink tag, a paragraph tag, a horizontal line tag, and a table element end tag in the HTML document;
audibly transmitting the contents of said document to said user, wherein said contents include at least one link to an additional document;
accepting an instruction from said user to retrieve said additional document; and
retrieving said additional document,
wherein said communication option of interacting with an e-mail account includes:
retrieving an e-mail from a mail account;
listing the subject line and send name of said e-mail for said user;
presenting the user with the option of sending one of several preselected replies by entering a code; and
sending an e-mail reply when selected by said user.

12. The method of claim 11 wherein said selecting one of said communication options using a predetermined code includes using a touch-tone generated code.

13. The method of claim 11 wherein said selecting one of said communication options using a predetermined code includes using a voice generated code.

14. The method of claim 11 wherein said accepting an instruction for said user to retrieve said additional document includes accepting a touch-tone instruction.

15. The method of claim 11 wherein said accepting an instruction for said user to retrieve said additional document includes accepting a voice instruction.

16. The method of claim 11 wherein said presenting the user with the option of sending one of several preselected replies by entering a code includes entering a touch-tone code.

17. The method of claim 11 wherein said presenting the user with the option of sending one of several preselected replies by entering a code includes entering a voice code.

18. A method for telephone-based electronic communication, said method comprising:
receiving an incoming telephone call from a user;
allowing said user to enter login and password information using predetermined codes;
verifying login and password information for said user to provide access to a menu of communication options;
presenting a menu of communication options to said user including:
interacting with newsgroups;
interacting with an e-mail account; and
browsing the internet; and
allowing said user to select one of said communication options using a predetermined code,
wherein said communication option of browsing the internet includes:
accepting a document location from said user specified by at least one of a favorites menu and a user input;
retrieving a text document including HTML tags specified by the document location;
building a new text body based on the text document, wherein the new text body includes HTML document table text in accordance with a subscript tag and a superscript tag; and
further comprising adding comma length pauses in accordance with at least one of: a list item tag, a hyperlink tag, a paragraph tag, a horizontal line tag, and a table element end tag in the HTML document;
converting the new text body to speech;
listing at least one link in the text document;
accepting input from said user to designate one of said links as a selected link; and
retrieving a second document specified by the selected link,
wherein said communication option of interacting with an e-mail account includes:
retrieving an e-mail from a mail account;
listing the subject line and send name of said e-mail for said user;
presenting the user with the option of sending one of several preselected replies by entering a code; and
sending an e-mail reply selected by said user,
wherein said communication option of interacting with newsgroups includes:
retrieving a list of available newsgroups;
listing the list of available newsgroups to said user;

accepting a newsgroup selection from said user specified by at least one of a favorites menu and a user input;

listing the articles present;

accepting a user selection of an article from said user; and audibly transmitting the article to said user.

19. The method of claim 18 wherein said selecting one of said communication options using a predetermined code includes using a touch-tone generated code.

20. The method of claim 18 wherein said selecting one of said communication options using a predetermined code includes using a voice generated code.

21. The method of claim 18 wherein said accepting an instruction for said user to retrieve said additional document includes accepting a touch-tone instruction.

22. The method of claim 18 wherein said accepting an instruction for said user to retrieve said additional document includes accepting a voice instruction.

23. The method of claim 18 wherein said presenting the user with the option of sending one of several preselected replies by entering a code includes entering a touch-tone code.

24. The method of claim 18 wherein said presenting the user with the option of sending one of several preselected replies by entering a code includes entering a voice code.

* * * * *